US010405562B2

United States Patent
Cocchi et al.

(10) Patent No.: US 10,405,562 B2
(45) Date of Patent: Sep. 10, 2019

(54) MACHINE AND METHOD FOR MAKING LIQUID OR SEMI-LIQUID FOOD PRODUCTS

(71) Applicant: ALI S.p.A.—CARPIGIANI GROUP, Milan (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco Sul (IT)

( * ) Notice: Subject to any disclaimer, the term of this patent is extended or adjusted under 35 U.S.C. 154(b) by 232 days.

(21) Appl. No.: 15/198,130

(22) Filed: Jun. 30, 2016

(65) Prior Publication Data
US 2017/0035074 A1     Feb. 9, 2017

(30) Foreign Application Priority Data

Aug. 6, 2015   (IT) ........................ 102015000042999

(51) Int. Cl.
*A23G 9/22*     (2006.01)
*A23G 9/28*     (2006.01)
(Continued)

(52) U.S. Cl.
CPC ............... *A23G 9/228* (2013.01); *A23G 9/04* (2013.01); *A23G 9/045* (2013.01); *A23G 9/08* (2013.01);
(Continued)

(58) Field of Classification Search
CPC .......... A23G 9/04; A23G 9/045; A23G 9/103; A23G 9/16; A23G 9/166; A23G 9/20;
(Continued)

(56) References Cited

U.S. PATENT DOCUMENTS 2,511,844 A * 6/1950 Grove .................. G05D 7/0106
                                                           122/14.3
4,226,343 A * 10/1980 Fling ........................ B67D 1/12
                                                              222/504
(Continued)

FOREIGN PATENT DOCUMENTS

EP     1524196 A1     4/2005
EP     2491792 A1     8/2012
(Continued)

OTHER PUBLICATIONS

Italian Search Report dated Dec. 17, 2015 for counterpart Italian Application No. IT UB20152936.

*Primary Examiner* — Cassey D Bauer
*Assistant Examiner* — Miguel A Diaz
(74) *Attorney, Agent, or Firm* — Shuttleworth & Ingersoll, PLC; Timothy J. Klima

(57) ABSTRACT

A machine for making liquid or semi-liquid food products includes a plurality of supply containers containing a basic mixture and deformable wall, so the space occupied by each first container depends on a quantity of basic mixture therein. A processing container includes a stirrer and thermal treatment system, operating with one another to convert the basic mixture into a liquid or semi-liquid product. A connecting system connects the supply containers to the processing container to transfer the basic mixture from one of the supply containers to the processing container and includes a plurality of pneumatically operated closing valves, where each of the valves is associated with one of the supply containers and can be activated and deactivated independently of the remaining valves to allow the placement of one of the containers in connection with the processing container.

8 Claims, 3 Drawing Sheets

(51) Int. Cl.
*A23G 9/20* (2006.01)
*B67D 1/12* (2006.01)
*A23G 9/16* (2006.01)
*A23G 9/04* (2006.01)
*A23G 9/10* (2006.01)
*A23G 9/08* (2006.01)
*B67D 1/00* (2006.01)

(52) U.S. Cl.
CPC .............. *A23G 9/10* (2013.01); *A23G 9/16* (2013.01); *A23G 9/166* (2013.01); *A23G 9/20* (2013.01); *A23G 9/22* (2013.01); *A23G 9/224* (2013.01); *A23G 9/28* (2013.01); *A23G 9/282* (2013.01); *B67D 1/12* (2013.01); *B01F 2215/0021* (2013.01); *B67D 2001/0093* (2013.01); *B67D 2001/0094* (2013.01)

(58) Field of Classification Search
CPC .......... A23G 9/28; A23G 9/282; A23G 9/228; A23G 9/224; A23G 9/08; A23G 9/22; B67D 2001/0093; B67D 2001/0094; B67D 1/12; B67D 1/1277; B67D 7/36; B01F 2215/0021
See application file for complete search history.

(56) References Cited

U.S. PATENT DOCUMENTS

| | | | | |
|---|---|---|---|---|
| 5,292,030 A * | 3/1994 | Kateman | ........... | A23G 9/04 222/1 |
| 5,494,194 A * | 2/1996 | Topper | ........... | A23G 9/28 222/146.6 |
| 5,727,713 A * | 3/1998 | Kateman | ........... | A23G 9/04 222/145.6 |
| 6,234,351 B1 * | 5/2001 | Wilcox | ........... | B65D 77/06 222/386.5 |
| 6,490,872 B1 * | 12/2002 | Beck | ........... | A23G 9/045 62/303 |
| 8,479,531 B2 * | 7/2013 | Maeda | ........... | A23G 9/12 222/95 |
| 9,918,484 B2 * | 3/2018 | Ekenhorst | ........... | A23G 9/20 |
| 2003/0085237 A1 * | 5/2003 | Kateman | ........... | A23G 9/045 222/1 |
| 2006/0134275 A1 * | 6/2006 | Maeda | ........... | A23G 9/12 426/106 |
| 2008/0023661 A1 * | 1/2008 | Gu | ........... | F16K 7/17 251/30.01 |
| 2008/0226779 A1 * | 9/2008 | Cocchi | ........... | A23G 9/228 426/231 |
| 2009/0191318 A1 * | 7/2009 | Cocchi | ........... | A23G 9/04 426/231 |
| 2012/0217264 A1 * | 8/2012 | Cocchi | ........... | A23G 9/04 222/95 |
| 2012/0251697 A1 * | 10/2012 | Cocchi | ........... | A23G 9/045 426/521 |
| 2013/0082075 A1 * | 4/2013 | Trulaske | ........... | B67D 1/1466 222/517 |
| 2013/0196035 A1 * | 8/2013 | Passet | ........... | A23G 9/24 426/101 |
| 2014/0356494 A1 * | 12/2014 | Cocchi | ........... | A23G 9/28 426/231 |
| 2015/0152970 A1 * | 6/2015 | Reeves | ........... | F16K 27/02 251/63.5 |
| 2015/0245634 A1 * | 9/2015 | Lazzarini | ........... | A23G 9/045 366/142 |
| 2016/0107873 A1 * | 4/2016 | Callaghan | ........... | B67D 1/0035 222/94 |
| 2016/0229675 A1 * | 8/2016 | Popov | ........... | B67D 1/0021 |
| 2017/0318830 A1 * | 11/2017 | Resnick | ........... | A23G 9/228 |

FOREIGN PATENT DOCUMENTS

| | | | | |
|---|---|---|---|---|
| EP | 2807930 A1 | 12/2014 | | |
| FR | 2136029 A5 | 12/1972 | | |
| GB | 2311590 A | * 10/1997 | ........... | F15B 21/044 |
| JP | 2005229966 A | 9/2005 | | |
| WO | WO9412048 A2 | 6/1994 | | |

* cited by examiner

MACHINE AND METHOD FOR MAKING LIQUID OR SEMI-LIQUID FOOD PRODUCTS

This application claims priority to Italian Patent Application 102015000042999 filed Aug. 6, 2015, the entirety of which is incorporated by reference herein.

BACKGROUND OF THE INVENTION

This invention relates to a machine for making liquid or semi-liquid food products, in particular ice cream or soft ice cream type products.

In the ice cream trade in question, (soft) ice cream machines are known which comprise a mixing and cooling cylinder associated with a refrigeration system and equipped with a stirrer.

The mixing and cooling cylinder allows making the finished product (ice cream or soft ice cream) from a basic mixture supplied by another container.

The basic mixture is supplied to the mixing and cooling cylinder by means of containers, that is to say, by flexible supply containers of a type known as "bag in box", which basically comprise a flexible wall provided with an opening (which can be pierced) to allow the product out.

These flexible supply containers are configured to deform as the product is tapped out of them. In other words, their volume depends on the quantity of product they contain.

Operators frequently complain that it is difficult to control the supply of basic mixture which all too often runs out during peak working hours when a particularly large number of customers are being served and staff are busy with their duties.

When the basic mixture inside the container runs out, the machine is temporarily down, that is to say, remains inoperative until the empty basic mixture supply container is replaced with a new container, full of mixture.

Thus, a need which is felt particularly strongly in the sector concerned is that of being able to switch in a very quick, easy and reliable manner from one supply container to another, thereby avoiding prolonged machine down times.

More in detail, a need which is felt particularly strongly in the sector concerned is that of enabling the operator to quickly change the supply container when it is empty.

SUMMARY OF THE INVENTION

This invention therefore has for an aim to overcome the above described drawbacks and that is to say, to meet the above mentioned need.

More specifically, the aim of this invention is to provide a machine which allows meeting the above mentioned need.

Another aim of the invention is to provide a machine for making liquid or semi-liquid products which allows reducing machine down times.

According to the invention, these aims are achieved by a machine and a method forming the object of the invention and comprising technical features as disclosed herein.

BRIEF DESCRIPTION OF THE DRAWINGS

The technical features of the invention, with reference to the above aims, are clearly disclosed herein and its advantages are apparent from the detailed description which follows, with reference to the accompanying drawings which illustrate a preferred, non-limiting example embodiment of the invention, and in which.

DESCRIPTION OF THE PREFERRED EMBODIMENTS

Figure 1:
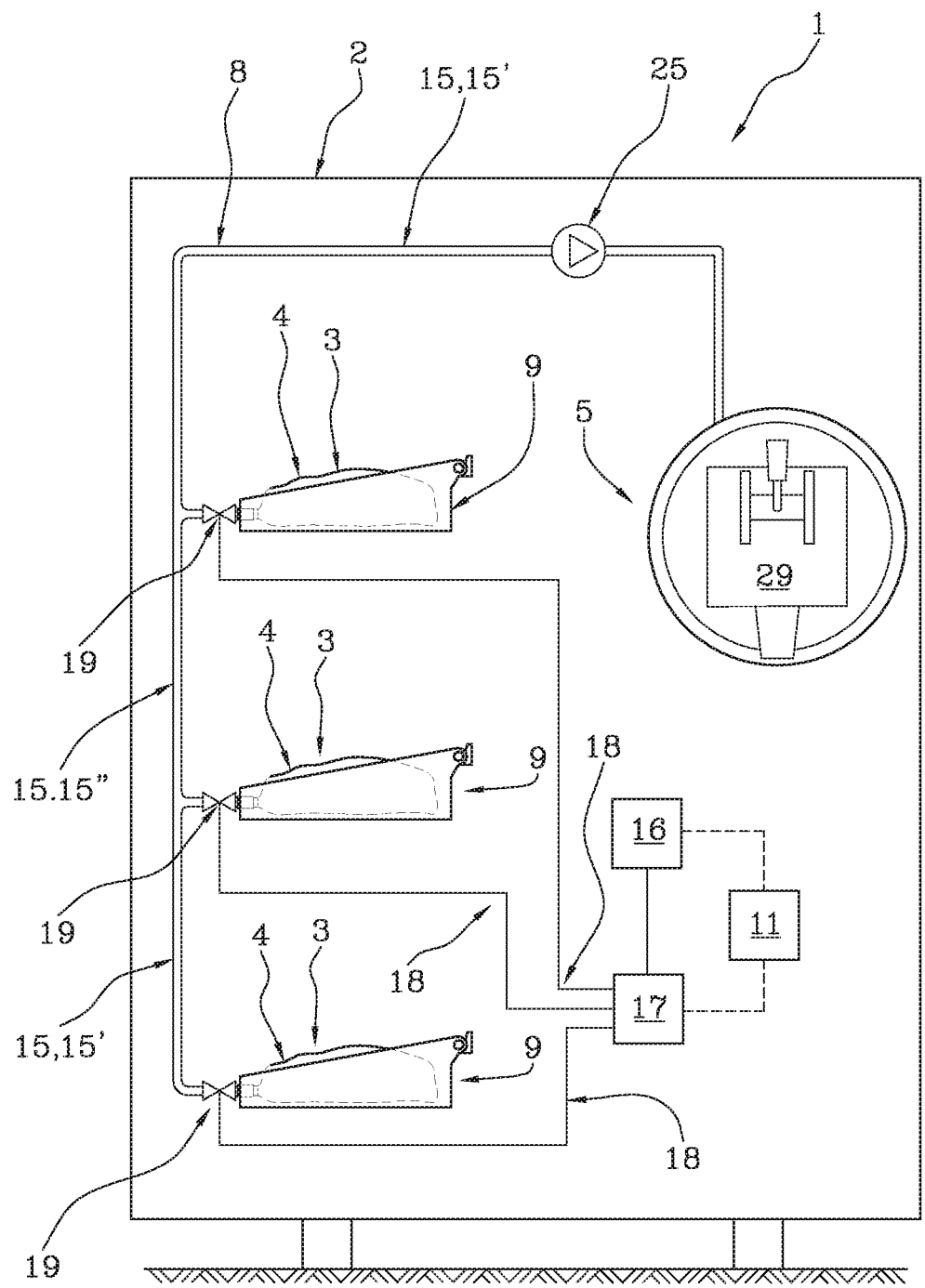
FIG. 1 is a schematic side view of a machine of this invention for making liquid or semi-liquid products.
Figure 2:
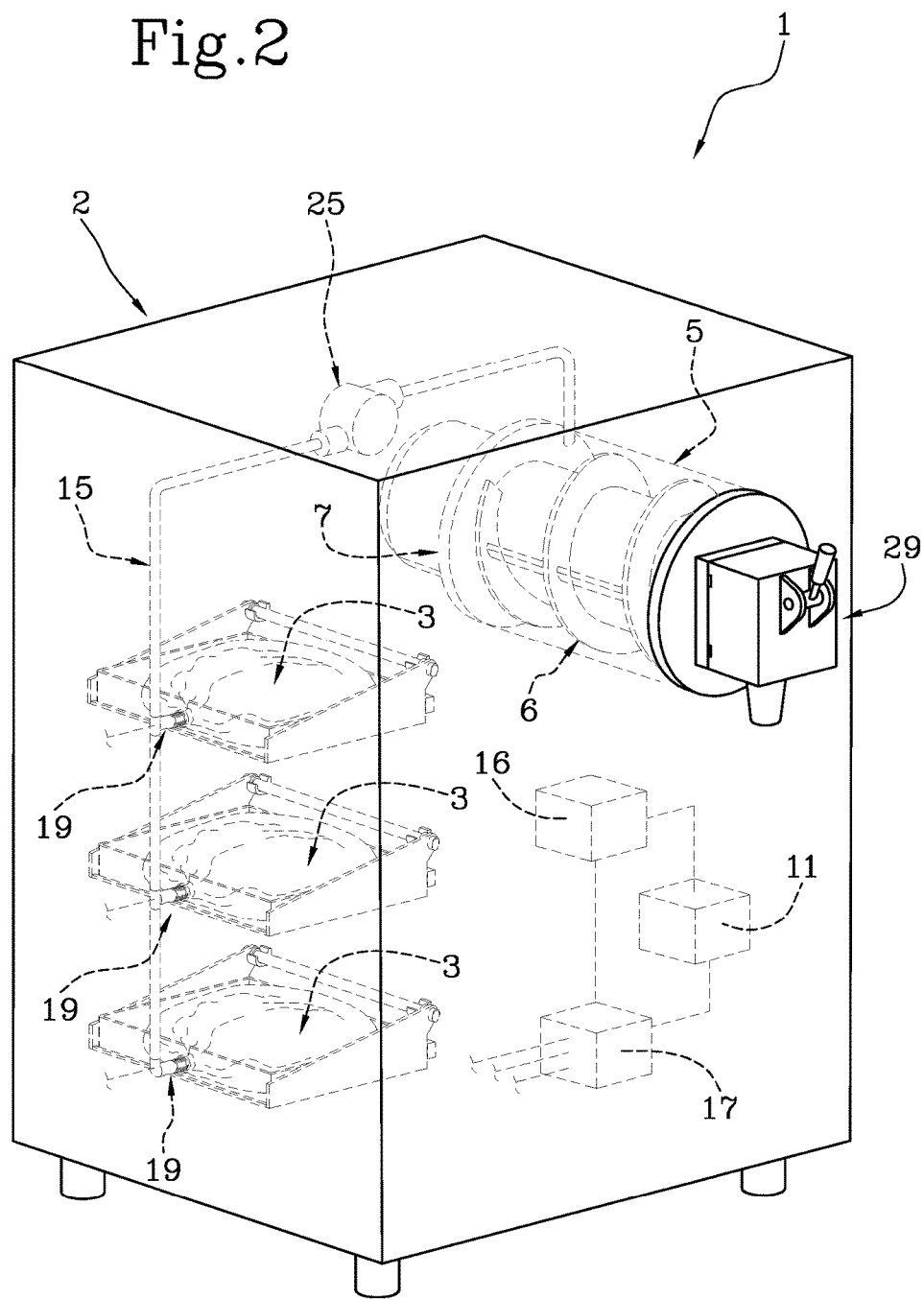
FIG. 2 is a schematic perspective view of the machine of FIG. 1 for making liquid or semi-liquid products.

With reference to the accompanying drawings, the numeral 1 denotes an apparatus or machine for making liquid or semi-liquid products.

In particular, the machine 1 allows making ice cream products.

More precisely, the machine 1 allows making one or more of the following products: artisan gelato, soft ice cream, sorbets.

Defined according to the invention is a machine 1 for making liquid or semi-liquid food products (ice cream and, more precisely, soft ice cream), comprising:

a frame 2;

a plurality of supply containers 3 containing a liquid or semi-liquid basic mixture and comprising a deformable wall 4, so that the space occupied by each first container 3 depends on a quantity of basic mixture in the self-same first container 3;

a processing container 5 forming a processing chamber (more precisely a mixing and cooling cylinder) for the basic mixture and provided with a stirrer 6 and with thermal treatment means 7 for the basic mixture, operating in conjunction with one another to convert the basic mixture into a liquid or semi-liquid product;

connecting means 8 for connecting the supply containers 3 to the processing container 5, configured to allow operatively connecting each of the supply containers 3 (selectively) to the processing container 5 and to transfer the basic mixture from each of the supply containers 3 to the processing container 5;

supporting means 9 for the supply containers 3, operatively associated with the frame 2, an electronic drive and control unit 11.

According to one aspect, the connecting means 8 comprise a plurality of connecting pipes 15 connecting the supply containers 3 to the processing container 5.

According to the invention, the connecting means 8 comprise a plurality of pneumatically operated closing valves 19, where each of the valves is associated with one of the supply containers 3 and can be activated and deactivated independently of the remaining valves 19 to allow placing one of the containers 3 (selectively) in connection with the processing container 5.

According to another aspect, the machine 1 also comprises:

a compressor 16 configured to generate compressed air;

a distributor 17 of compressed air, connected to the compressor 16 to receive compressed air and controllable by the electronic drive and control unit 11;

a plurality of service pipes 18 connecting the distributor 17 of compressed air to the valves 19 to bring a flow of compressed air to each of the valves 19, the distributor 17 of compressed air being configured to be able to release an air flow independently to each of the valves 19.

It should be noted that the means 7 for thermally treating the basic mixture comprise a thermodynamic system (not illustrated) equipped with at least one heat exchanger (evaporator) associated with the processing container 5.

Preferably, the thermal system comprises a hydraulic circuit provided with a heat exchanger fluid.

Preferably, the thermal system operates according to a thermodynamic cycle.

According to the invention, each of the pneumatically operated valves 19 is a normally closed valve.

The thermal treatment means are configured to allow cooling the basic mixture inside the processing container 5, preferably to a temperature of between −20° C. and 0° C. and, still more preferably, to a temperature of between −20° C. and −5° C.

It should be noted that the control unit 11 is configured to simultaneously activate both the stirrer 6 and the thermal treatment means 7 so that cooling and mixing are carried out simultaneously.

Also according to the invention, each of the pneumatically operated valves 19 is provided with:

an inlet duct 22, connected to one of the supply containers 3;

an outlet duct 21 connected to a connecting pipe 15;

a closing element 20, movable between a shutoff position and one of establishing a connection between the inlet duct 22 and outlet duct 21;

a spring 23 operatively acting on the closing element 20 to apply a force aimed to bring back and/or keep the closing element 20 in the shutoff position.

Figure 3:
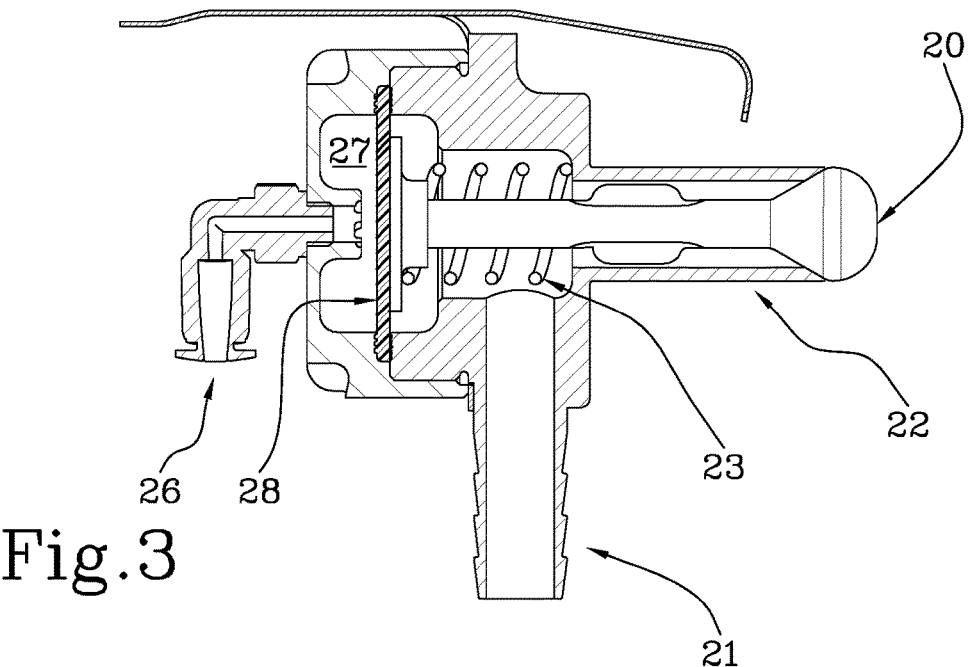
FIGS. 3 and 4 show respective perspective views of certain details of the machine according to the invention in different operating configurations.
Figure 4:
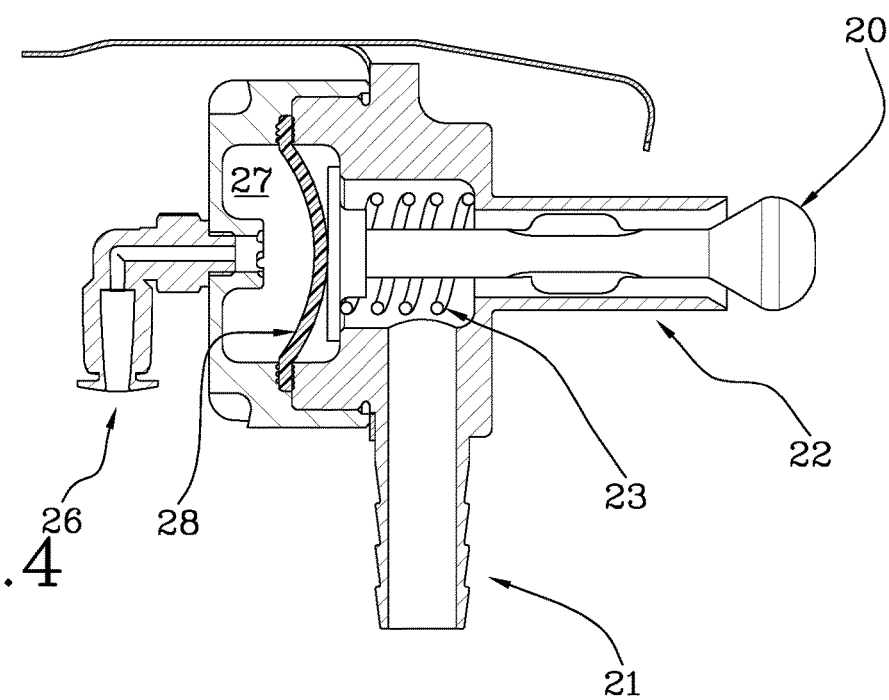

The valve 19 is illustrated in FIG. 3 in a (closed) configuration where the closing element 20 is in the position of shutting off the connection between the inlet duct 22 and the outlet duct 21, whilst in FIG. 4, it is illustrated in an (open) configuration where the closing element 20 is in the position of establishing the connection between the inlet duct 22 and the outlet duct 21.

It should be noted that the pneumatically operated valve 19 is also provided with a control inlet 26 adapted to be connected to a source of compressed air by which the valve 19 itself is activated or closed, that is to say to control the positioning of the closing element 20 between the aforementioned positions of shutting off and establishing the connection between the inlet duct 22 and the outlet duct 21.

In practice, the pressurized air supplied to the control inlet allows moving the closing element 20 between the position of shutting off the connection (where it is normally kept) and the position of establishing the connection.

More precisely, the control inlet 26 is connected to the compressed air distributor 17 through a service pipe 18 so as to be supplied with compressed air by the distributor 17 itself.

It should be noted that the valve 19 is provided with a control chamber 27 adapted to receive the compressed air coming from the control duct 26.

It should be noted that the closing element 20, in one embodiment, defines a (movable) portion of the wall of the control chamber 27.

In another embodiment, on the other hand, the control chamber 27 is provided with a deformable wall 28 (membrane) which, as a result of pressurized air entering the control chamber 27, applies a pushing force on the closing element 20.

It should be noted that, normally, that is to say, when compressed air is not being supplied to the valve 19 (more precisely, when compressed air is not being supplied to the control duct 26), the closing element 20 is in the position of shutting off the connection between the inlet duct 22 and the outlet duct 21.

According to another aspect, the machine comprises an interface (not illustrated) connected to the drive and control unit 11 and provided with control commands, which can be activated to control the valves 19 so as to selectively place one of the supply containers 3 in fluid communication with the processing container 5.

In practice, the interface allows sending a control signal to the control and drive unit 11 which in turn, as a function of these control signals, selectively opens one of the valves 19 (based on the selection made).

According to yet another aspect, the machine 1 comprises a transfer pump 25 operatively interposed between the supply containers 3 and the processing container 5 to transfer fluid from the supply containers 3 to the processing container 5.

Preferably, the transfer pump 25 is operatively connected to each of the supply containers 3: it should be noted that the valve 19, when it is in the open position, allows establishing the fluid connection between the respective supply container 3 and the pump 25, whilst when it is in the closed position, it inhibits the fluid connection between the respective supply container 3 and the pump 25.

It should be noted that the transfer pump 25 is preferably a peristaltic pump.

Preferably, the pump 25 is associated with the connecting ducts 15.

In a variant embodiment not illustrated, the machine 1 comprises, for each supply container 3, a receptacle (which is rigid, that is substantially non-deformable due to air pressure below 10 bar) adapted to contain the supply container 3 and able to be sealedly closed.

According to this variant embodiment, pressurized air is sent into the receptacle in order to cause the supply container 3 to be compressed, thus squeezing the basic mixture out of the supply container 3.

It should be noted that the assembly defined by the supply container 3 and the receptacle containing it forms what is known as a "bag in box".

In this variant embodiment, therefore, the pump 25 is not used because transfer of the basic mixture to the processing container 5 is accomplished by the effect of compressing the supply container 3 inside its receptacle.

It should be noted that the machine 1 according to the invention allows switching between one supply container 3 and another in a particularly simple manner.

The fact that the valve 19 is pneumatic and that the machine 1 is equipped with a compressor 16 and a compressed air distributor 17 means that the processing container 5 can be supplied in a particularly reliable manner with any type of basic ice cream product under all typical shop working conditions.

According to another aspect, the machine 1 is equipped with a dispenser 29 connected to the processing container 5 to serve the product from the processing container 5.

Also defined is a method for making liquid or semi-liquid food products, starting with a basic mixture, comprising the following steps:

preparing a plurality of supply containers 3 containing a basic mixture and comprising a deformable wall 4 so that the space occupied by each first container 3 depends on a quantity of basic mixture inside the supply container 3;

preparing a processing container 5 forming a processing chamber for the basic mixture;

operatively connecting each of the supply containers 3 to the processing container 5 by means of connecting ducts 15 and preparing a pneumatically operated valve 19 associated with each supply container 3;

sending a flow of compressed air to one of the valves 19 to place a first of the supply containers 3 in fluid communication with the processing container 5 (through a portion of the connecting ducts 15);

transferring the basic mixture from the first of the supply containers 3 to the processing container 5;

stirring the basic mixture in the processing container 5 and (simultaneously) thermally treating the basic mixture in the processing container 5 to convert the basic mixture into a finished product.

It should be that if the finished product is ice cream, the step of stirring the basic mixture inside the processing container 5 and (simultaneously) thermally treating the basic mixture inside the processing container 5 to convert the basic mixture into a finished product corresponds to all intents and purposes to the step of mixing and cooling the ice cream, where the basic mixture is cooled and stirred in order to incorporate air into it to give the ice cream product a suitably creamy and palatable consistency (by increasing the value of overrun, which indicates the percentage of air incorporated in the finished product).

What is claimed is:

1. A machine for making liquid or semi-liquid food products, comprising:
    a frame;
    a supporting system operatively associated with the frame for supporting a plurality of supply containers, where each of the plurality of supply containers contains a liquid or semi-liquid basic mixture and comprises a deformable wall, so that a space occupied by each of the plurality of supply containers depends on a quantity of basic mixture in each of the plurality of supply containers, wherein the supporting system includes an engagement surface for each of the plurality of supply containers to engage and support each of the plurality of supply containers;
    a processing container forming a processing chamber for the basic mixture and including a stirrer and a thermal treatment system operating in conjunction with one another to convert the basic mixture into a liquid or semi-liquid product, the thermal treatment system including a heat exchanger associated with the processing container;
    a connecting system for connecting the plurality of supply containers to the processing container, the connecting system configured to allow an operative connection of each of the plurality of supply containers to the processing container and to transfer the basic mixture from each of the plurality of supply containers to the processing container;
    an electronic drive and control unit including a controller,
    wherein the connecting system includes at least one connecting pipe for connecting the plurality of supply containers to the processing container and a plurality of pneumatically operated closing valves, where each of the pneumatically operated closing valves is associated in use with one of the plurality of supply containers and is configured for activation and deactivation independently of others of the plurality of pneumatically operated closing valves to allow the placement of the one of the plurality of supply containers in connection with the processing container;
    a compressor configured to generate compressed air;
    a distributor of the compressed air, connected to the compressor to receive the compressed air and controllable by the electronic drive and control unit;
    a plurality of service pipes connecting the distributor of compressed air to the plurality of pneumatically operated closing valves to supply the compressed air to each of the plurality of pneumatically operated closing valves, the distributor of compressed air being configured to independently supply the compressed air to each of the plurality of pneumatically operated closing valves;
    wherein each of the plurality of pneumatically operated closing valves comprises:
        an inlet duct including an inlet opening positioned at an entrance to the inlet duct, the inlet opening connected in use to one of the plurality of supply containers;
        an outlet duct connected in use to the at least one connecting pipe;
        a closing element, movable between a shutoff position and an open position, the open position establishing a flow connection between the inlet duct and the outlet duct and the shutoff position blocking the flow connection between the inlet duct and the outlet duct;
        a spring operatively acting on the closing element to bias the closing element toward the shutoff position;
        a control inlet, which is connectable by one of the plurality of service pipes to the distributor of compressed air, and
        a control chamber connected to the control inlet and including a movable wall operatively acting on the closing element to move the closing element between the shutoff position and the open position;
        wherein the movable wall includes a deformable membrane;
        wherein the closing element includes a closing surface that operatively acts on an end wall of the inlet opening of the inlet duct to close the inlet duct;
    wherein the control chamber, the movable wall, and the closing element are disposed one after another along a line of biasing force of the spring.

2. The machine according to claim 1, and further comprising the plurality of supply containers.

3. The machine according to claim 1, wherein the distributor of the compressed air includes an inlet connected to the compressor and a plurality of outlets respectively connected to the plurality of service pipes, where the plurality of outlets are selectively connectable to the inlet.

4. The machine according to claim 1, and further comprising a transfer pump operatively interposed between the plurality of supply containers and the processing container to transfer the basic mixture from the plurality of supply containers to the processing container.

5. The machine according to claim 4, wherein the transfer pump is a peristaltic pump.

6. The machine according to claim 1, wherein the at least one connecting pipe includes a plurality of connecting pipes for connecting the supply containers to the processing container.

7. The machine according to claim 6, wherein each of the plurality of pneumatically operated valves is a normally closed valve.

8. The machine according to claim 6, wherein the plurality of connecting pipes includes a first common pipe, included in a passage of the basic mixture coming from any of the plurality of supply containers, and a plurality of second pipes included in the passage of the basic mixture coming only from certain of the plurality of supply containers.

* * * * *